(12) United States Patent
Sharma et al.

(10) Patent No.: US 11,537,747 B1
(45) Date of Patent: Dec. 27, 2022

(54) GENERATING AND CONTINUOUSLY MAINTAINING A RECORD OF DATA PROCESSING ACTIVITY FOR A COMPUTER-IMPLEMENTED SYSTEM

(71) Applicant: Relyance Inc., Mountain View, CA (US)

(72) Inventors: Abhishek Sharma, Mountain View, CA (US); Leila Rose Golchehreh, San Francisco, CA (US); Theophile Gervet, Pittsburgh, PA (US); Amer Alsabbagh, Gurnee, IL (US); Sara Higgins, Hayward, CA (US); Evan Fairweather, Aptos, CA (US)

(73) Assignee: RELYANCE INC., Mountain View, CA (US)

( * ) Notice: Subject to any disclaimer, the term of this patent is extended or adjusted under 35 U.S.C. 154(b) by 0 days.

(21) Appl. No.: 17/705,232

(22) Filed: Mar. 25, 2022

(51) Int. Cl.
*G06F 7/04* (2006.01)
*H04N 7/16* (2011.01)
*G06F 21/62* (2013.01)
*G06F 16/21* (2019.01)

(52) U.S. Cl.
CPC ........ *G06F 21/6245* (2013.01); *G06F 16/219* (2019.01); *G06F 21/6272* (2013.01)

(58) Field of Classification Search
CPC . G06F 21/6245; G06F 16/219; G06F 21/6272
USPC .......................................................... 726/26
See application file for complete search history.

(56) References Cited

U.S. PATENT DOCUMENTS

| | | | |
|---|---|---|---|
| 10,489,430 B1* | 11/2019 | Rogynskyy | ...... G06Q 10/06315 |
| 11,256,659 B1* | 2/2022 | Gu | ........... G06F 16/254 |
| 2004/0128169 A1* | 7/2004 | Lusen | ............ G06Q 10/10 |
| | | | 707/999.009 |
| 2018/0102936 A1* | 4/2018 | Curtis | ............. H04L 43/04 |
| 2019/0361924 A1* | 11/2019 | Rogynskyy | ....... G06F 16/215 |
| 2020/0311631 A1* | 10/2020 | Hecht | ............ G06F 21/6245 |

* cited by examiner

*Primary Examiner* — Monjur Rahim
(74) *Attorney, Agent, or Firm* — Calfee, Halter & Griswold LLP

(57) ABSTRACT

Technologies related to generating and continuously maintaining a record of data processing activities are described herein, where the processing record is generated on behalf of an enterprise that operates an enterprise computing system. The processing record includes numerous fields related to the processing of data by the enterprise computing system, and such fields are automatically generated based upon information pertaining to the enterprise computing system that is acquired from several different sources.

20 Claims, 8 Drawing Sheets

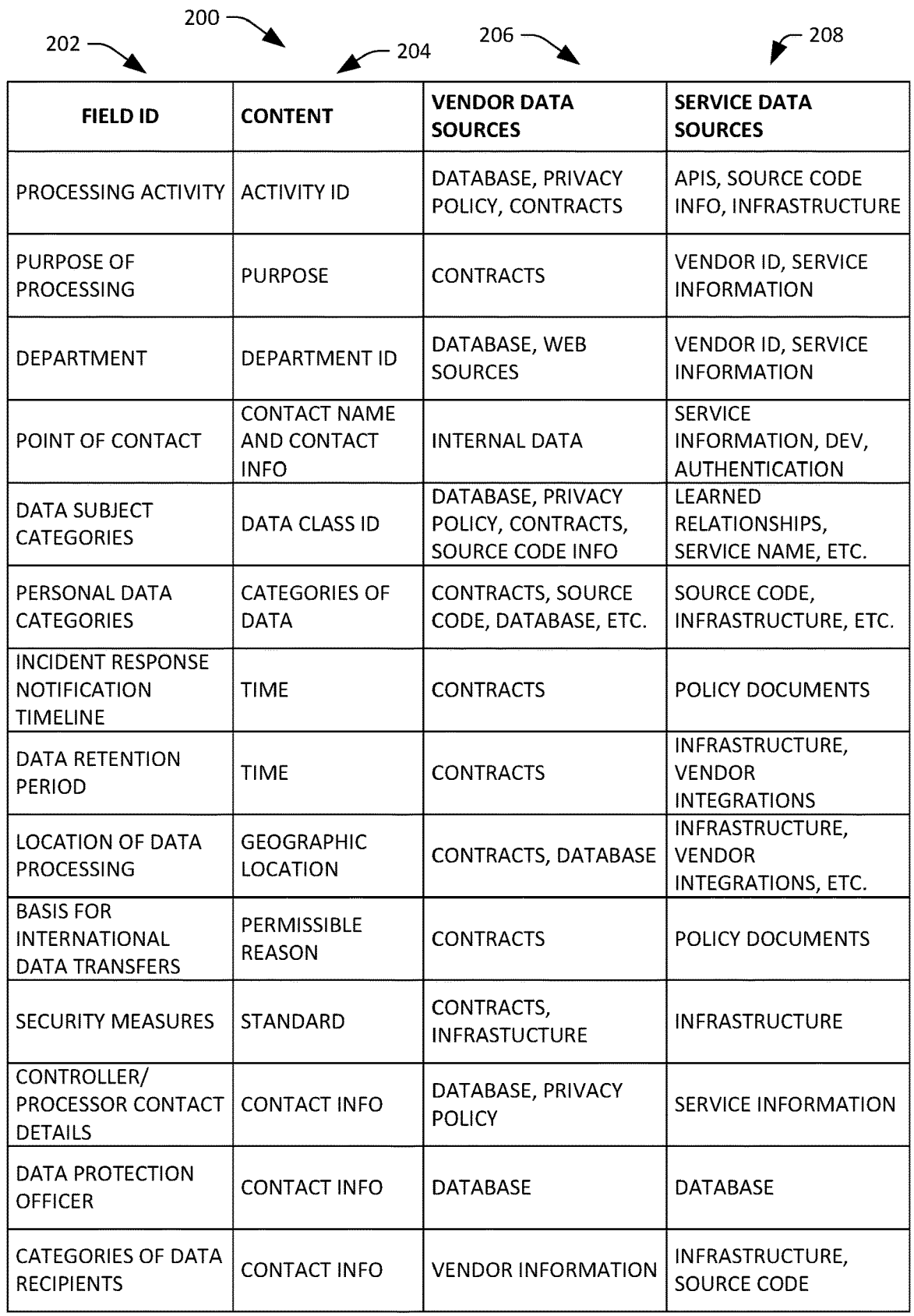

| FIELD ID | CONTENT | VENDOR DATA SOURCES | SERVICE DATA SOURCES |
|---|---|---|---|
| PROCESSING ACTIVITY | ACTIVITY ID | DATABASE, PRIVACY POLICY, CONTRACTS | APIS, SOURCE CODE INFO, INFRASTRUCTURE |
| PURPOSE OF PROCESSING | PURPOSE | CONTRACTS | VENDOR ID, SERVICE INFORMATION |
| DEPARTMENT | DEPARTMENT ID | DATABASE, WEB SOURCES | VENDOR ID, SERVICE INFORMATION |
| POINT OF CONTACT | CONTACT NAME AND CONTACT INFO | INTERNAL DATA | SERVICE INFORMATION, DEV, AUTHENTICATION |
| DATA SUBJECT CATEGORIES | DATA CLASS ID | DATABASE, PRIVACY POLICY, CONTRACTS, SOURCE CODE INFO | LEARNED RELATIONSHIPS, SERVICE NAME, ETC. |
| PERSONAL DATA CATEGORIES | CATEGORIES OF DATA | CONTRACTS, SOURCE CODE, DATABASE, ETC. | SOURCE CODE, INFRASTRUCTURE, ETC. |
| INCIDENT RESPONSE NOTIFICATION TIMELINE | TIME | CONTRACTS | POLICY DOCUMENTS |
| DATA RETENTION PERIOD | TIME | CONTRACTS | INFRASTRUCTURE, VENDOR INTEGRATIONS |
| LOCATION OF DATA PROCESSING | GEOGRAPHIC LOCATION | CONTRACTS, DATABASE | INFRASTRUCTURE, VENDOR INTEGRATIONS, ETC. |
| BASIS FOR INTERNATIONAL DATA TRANSFERS | PERMISSIBLE REASON | CONTRACTS | POLICY DOCUMENTS |
| SECURITY MEASURES | STANDARD | CONTRACTS, INFRASTUCTURE | INFRASTRUCTURE |
| CONTROLLER/ PROCESSOR CONTACT DETAILS | CONTACT INFO | DATABASE, PRIVACY POLICY | SERVICE INFORMATION |
| DATA PROTECTION OFFICER | CONTACT INFO | DATABASE | DATABASE |
| CATEGORIES OF DATA RECIPIENTS | CONTACT INFO | VENDOR INFORMATION | INFRASTRUCTURE, SOURCE CODE |

FIG. 2

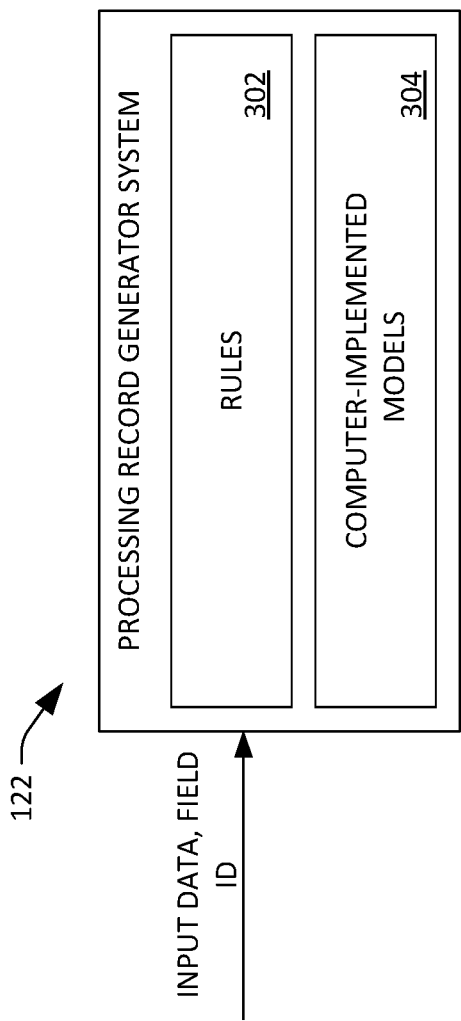

GENERATING AND CONTINUOUSLY MAINTAINING A RECORD OF DATA PROCESSING ACTIVITY FOR A COMPUTER-IMPLEMENTED SYSTEM

BACKGROUND

Organizations are building increasingly complex computer-implemented systems. In an example, computing systems may include proprietary code generated by developers of an organization, oftentimes in multiple different programming languages, where such code, when compiled and executed, corresponds to computer-executable modules that consume data from and/or pass data to other computer-executable modules (where, for example, a computer-executable module may be a microservice, a portion of monolithic code, etc.). In addition, one or more of the computer-executable modules may consume data from and/or pass data to computing systems of third parties (sometimes referred to as "vendors"). The computing systems of the third parties may then process data received from the computer-executable modules referenced above in a manner that is not transparent to the organization. Modern organizations also use large scale open source self-hosted tools and infrastructure for data processing and storage.

As a consequence of the complexities of modern organization computing systems, and further as a consequence of these computing systems being subjected to frequent change, understanding what types of data are being passed to and consumed by computer-executable modules and third-party computing systems, and also understanding how certain type(s) of data flow between computer-executable modules and third-party computing systems, is incredibly challenging. In an example, a data protection officer (DPO) or other privacy, security, data governance, or other individual of an organization (collectively referred to as the "officer") is tasked with ensuring that the organization, when processing personal data (data related to a person, persons, household, etc., including de-identified data that relates to a person, persons, household, etc.), does not violate data privacy policies, statutes, and/or regulations. Thus, the officer must not only be up to date on current policies, statutes, and regulations related to data privacy, but the officer must also be aware of how personal data is processed in the computing system of the organization.

Relatively recently, legislative bodies of various countries have implemented laws and regulations pertaining to the processing of information related to a person, persons, household, etc. To comply with such regulations, an organization may be requested to present a data map, inventory, and/or record of processing activity ("ROPA") to a regulator, where the data map, inventory, and/or ROPA includes fields that must be populated to identify various information about how data relating to a person, persons, household, etc. is processed by the organization. Example fields included in a ROPA, for instance, comprise, but are not limited to, personal data and information processing details, a type of processing activity undertaken on data relating to a person or persons, a basis for performing the processing activity, nature and purpose of that data processing, data lineage information, including subprocessors, so data may be tracked down a full chain, the lawful basis of processing, a geographic location where the processing activity is performed, security measures in place, amongst several others. Additional fields may also be included, whether or not required under law or regulation, given the nature of the arrangement or agreement between the parties, internal policies, procedures, or otherwise, so data protection professionals and others have a full picture and understanding of data flows, including data subject information, including how data subject requests will be handled, the nature of the industry in which a data processor or data controller is acting, etc.

Conventionally, to generate a ROPA for the organization, the officer must manually populate fields of the ROPA with appropriate values, where certain fields are required or can be populated with values generally collected by the organization. As indicated above, the computing system of the organization may be complex, and therefore the officer may not have a complete understanding of what data is processed within or outside their organization, how vendors process data, where such data is processed, etc. Typically, to complete a ROPA, the officer generates and transmits surveys to engineers, product managers, data scientists, data analysts, business intelligence teams, etc., in an attempt to acquire appropriate information to satisfy the regulator who is requesting the ROPA. This manual approach is prone to mistakes, oversight, acquisition of incorrect information and other problems that can have extremely undesirable consequences for the organization, including data security or privacy incidents, reputational damage, and substantial fines.

Conventional computer-implemented technologies are ill-equipped to assist the data protection officer or other privacy professional with completing a ROPA. A conventional computer-implemented technology includes generation of log files that describe certain events that occur when a computer-implemented application is executed by a computer processor. These log files, however, are quite large and, with respect to complex computer systems, do not include information required for a ROPA to be properly completed. For instance, as indicated above, a computing system may transmit information relating to a person, persons, household, etc. to a third-party system (unbeknownst to an end user), where the third-party system processes the information related to the person, persons, household, etc. in such a way that the processing is to be reported in the ROPA. A log file does not capture such information (or various other information that is to be included in the ROPA).

To add still further to the difficulties associated with ROPAs, the organization may be subject to regulations of multiple different jurisdictions, each of which may have their own respective ROPA requirements, whether it is different fields required, different formats, different languages, or other specific requirements. The officer, then, must understand multiple different requirements of multiple different jurisdictions and acquire requisite information to populate ROPAs that may be requested by several different regulators. Currently, there are no suitable computer-implemented technologies to assist with generating a ROPA that complies with requests of regulators in different jurisdictions.

SUMMARY

The following is a brief summary of subject matter that is described in greater detail herein. This summary is not intended to be limiting as to the scope of the claims.

Described herein are various technologies pertaining to computer-implemented technologies for automatically generating and maintaining a data processing record, where, in an example, the data processing record is configured to facilitate compliance with a requirement, law, and/or policy, including without limitation a record of processing activity (ROPA) for an organization. As will be described in greater detail herein, information that indicates: 1) that a computer system of an organization is processing data, including but not limited to data relating to a person or persons (e.g., name, contact information, demographics, etc.) or household; and 2) f how that data is being processed is obtained from several different data sources, where the data sources comprise: a) first data sources that include information that is unique and proprietary to the organization; and b) second data sources that include information that is available to the general public.

Information that is unique and proprietary to the organization includes information acquired from analysis of source code of the organization (where the analysis may be static or dynamic analysis), information that is acquired based upon analysis of infrastructure of the computing system of the organization (e.g., identities of modules executed by the computing system and interconnections between modules of the computing system), computer-readable documents that are unique and/or proprietary to the organization, such as data privacy policies, contracts between the organization and its vendors or customers, etc. Information that is available to the general public includes information that can be acquired from webpages available by way of the World Wide Web, publicly accessible databases, such as databases that provide information about organizations (e.g., identities of officers of the organization, department heads of the organization, descriptions of activities of the organizations, etc.). Information that is available to the general public can further include information available by way of publicly exposed application programming interfaces (APIs) of third-party services integrated with the computing system of the organization, and so forth.

The data processing record that is to be generated includes numerous fields that are to be populated with values (text and/or numerical), where the values are inferred based upon the obtained information referenced above. The data processing record, which includes the fields, is configured to facilitate satisfying requirements of at least one regulator for a jurisdiction that requires provision of a ROPA. In an example, the data processing record includes fields that collectively facilitate satisfaction of requirements of multiple regulators, laws, policies, or other requirements from multiple jurisdictions that require provision of a ROPA. In such an example, regardless of the regulator and jurisdiction that is requesting the ROPA, the data processing record, by combining a set of unified fields in a database in a particular format, is configured to facilitate satisfying requirements of the regulator.

The data processing record is designed based upon requirements, rules, policies, laws, regulations, and/or ROPA templates of numerous jurisdictions. By analyzing multiple ROPA templates from multiple jurisdictions, the inventors ascertained that several fields in the ROPAs (although potentially in different languages and using different terminology) are configured to receive information that is semantically equivalent. Examples of fields that can be populated in the data processing record include fields set out under relevant requirements, which may include, but are not limited to, "processing activity", "security measures", "purpose of processing", "department", "point of contact", "data subject categories", as well as other fields that may not be specified in a law, regulation, etc., where such fields may include "data subject requests", which sets out the requirements surrounding requests received from an individual or data subject, amongst others. The technologies described herein are configured to populate these fields with values automatically, where the values are inferred based upon portions of the obtained information noted briefly above. Hence, the computer-implemented technologies automatically populate fields of the data processing record based upon learned semantic mappings between the fields and portions of the obtained information that is used to populate such fields. Furthermore, computer-implemented machine-learning technologies can learn associations between fields in data processing records and can predict types of information that are to be included in the fields based upon these learned associations. In an example, when the computer-implemented technologies described herein infer a value for a processing activity (where such value is known to be included in the data processing record), the computer-implemented technologies can predict other fields that are to be included in the data processing record based upon the processing activity field being included in the data processing record (such as "data subject category", "basis of processing", "department", amongst others). In connection with populating fields of the data processing record, the technologies described herein can utilize computer-executable rules, filters, machine learning technologies, associativity principles, and other user interface controls that are configured to remove extraneous information, and so forth with respect to the obtained information.

The technologies described herein exhibit various advantages over conventional computer-implemented technologies that are used in connection with satisfying requests for ROPAs set forth under laws, regulations, and/or policies or other legal or contractual requirements. In contrast to conventional approaches, which involve using computing systems to email surveys to engineers and requesting information from engineers which is later used to manually fill in a survey or survey-like word processing system, the computer-implemented technologies described herein are configured to automatically populate fields of a processing record to facilitate satisfying a request from a regulator for a ROPA, a policy, law, contract, or other obligation or best practice with respect to data processing activities. Moreover, the technologies described herein allow for obtainment of information that is unable to be obtained by way of computer-implemented logging.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates a portion of an exemplary data processing record as well as corresponding information utilized to populate such record.

FIG. 3 is a functional block diagram of a processing record generator system that is configured to construct a data processing record for an organization based upon electronic data obtained about a computing system of the organization, where the data processing record indicates that the computing system of the organization processes data about a person, persons, household etc.

DETAILED DESCRIPTION

Figure 1:
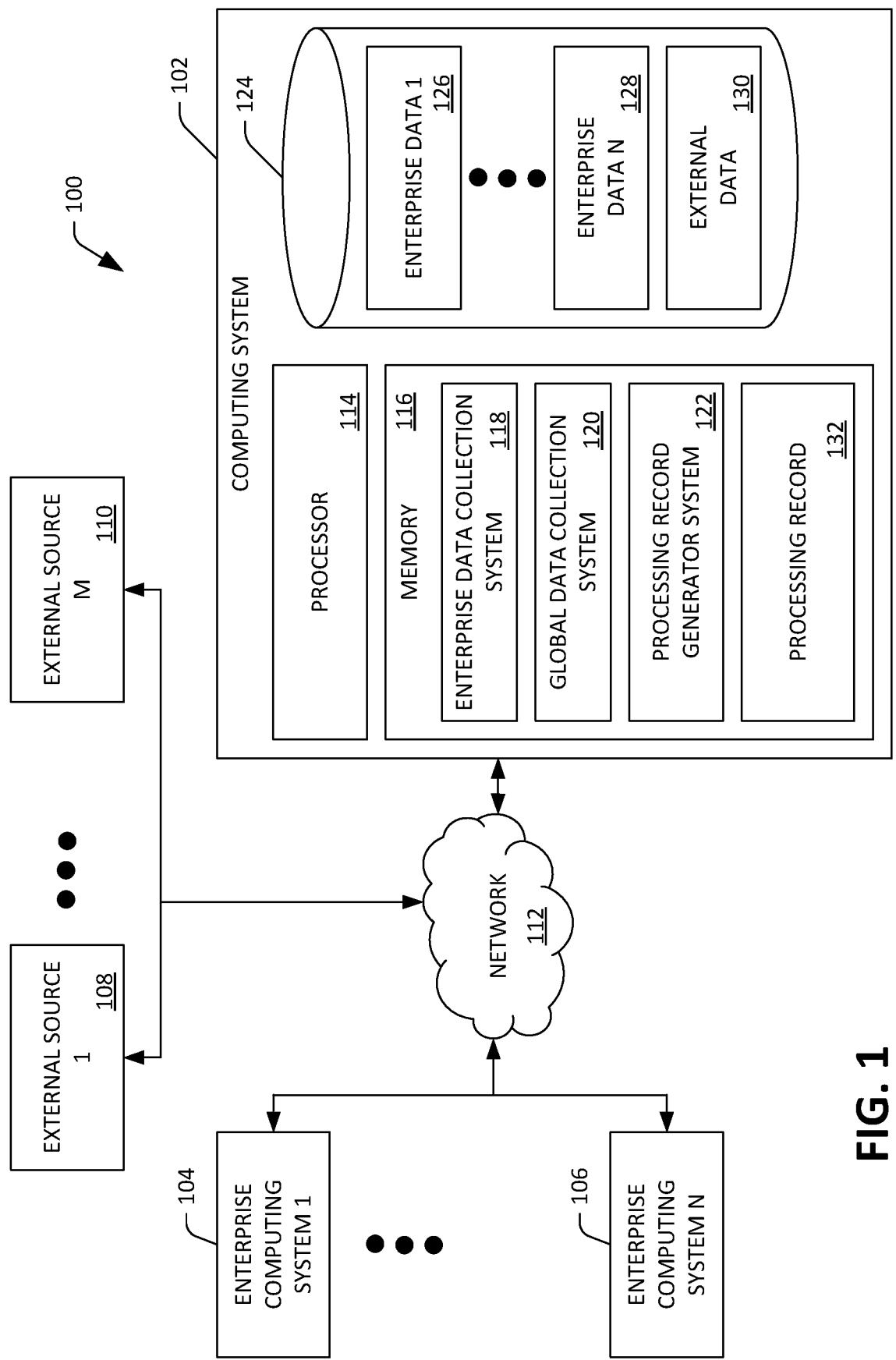
FIG. 1 is a functional block diagram of an exemplary computing system that is configured to generate a populated data processing record, where the data processing record indicates that a computing system of an organization processes data relating to a person, persons, a household, etc.

Various technologies pertaining to automatic construction of a processing record that indicates that a computing system of an organization is processing data related to a person, persons, and/or household are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The technologies described herein are particularly well-suited for use in connection with organization computing systems that process data, including personal data, where the term "personal data" refers to data that relates to a person, persons, and/or household, including de-identified and pseudo-anonymous data. Thus, the term "personal data" includes (without limitation) such data types as a name, an electronic account identifier, financial data, contact information, home addresses, employment information, IP address, either in the clear or de-identified/anonymized, amongst other data. Processing of data includes any suitable type of processing, including but not limited to deleting, collecting, storing, modifying, copying, transmitting, and the like. Utilizing the technologies described herein, an organization can generate a data processing record automatically, where the technologies described herein take into account, in the automatic generation of the data processing record, the jurisdictional nuances associated with the requester of the processing record. In summary, described herein are technologies that are configured to acquire information related to a computing system of an organization from a variety of data sources, where the data sources include: 1) first data sources that include information that is unique and proprietary to the organization, which may include agreements, contracts, policies, source code, infrastructure information, application programming interfaces, and other information; and 2) second data sources that include information relating to the computing system of the organization that is available to the general public. The information relating to the computing system of the organization that is available to the general public may include without limitation contact information of the organization, identities of officers of other organizations whose applications receive personal data from the computing system of the organization, geographic locations of computing devices of other organizations who process personal data on behalf of the organization, and so forth.

In addition, described herein are technologies that are configured to construct a data processing record based upon the obtained information referenced above. Constructing the data processing record includes populating fields of the data processing record with values based upon at least a portion of the obtained information referenced above, wherein the data processing record, once constructed, is configured to assist an organization with satisfying requirements of a regulator who is requesting a ROPA from the organization. Example fields of the data processing record include, but are not limited to, "Personal Data Types" (which may include without limitation "name", "IP address", "contact information", "salary", etc.), "Processing Activity" (which can be populated by one of a predefined type of processing activity, such as "transmission", "retention", "anonymizing", etc.), "Purposes of Processing Activities" (which can be populated with text indicating reason(s) for which processing of data is permissible), "Department" (which can be populated with a business department that is responsible for the computer-executable code that processes the personal data), "Point of Contact" (which can be populated with a name of a contact person for the business department or a data protection officer, etc.), "Basis of Processing" (which may include consent, legitimate interests, contract,) etc. The data processing record includes numerous fields, and such fields can be populated with values that are based upon the obtained information. In another example, one or more fields can be populated with values that are generated using machine learning technologies, where the machine learning technologies predict the values for the one or more fields based upon values of other fields.

While reference is made to the technologies described herein as being well-suited with respect to personal data, it is to be understood that the technologies described herein are not so limited, as such technologies can be employed to generate data processing records corresponding to any suitable predefined type of data.

With reference now to FIG. 1, a functional block diagram of an exemplary computing environment 100 is illustrated, where the computing environment 100 facilitates construction of a data processing record that includes an entry (e.g., a populated field), where the entry indicates that a computing system of an enterprise (organization) processes data relating to a person, persons, and/or household. The computing environment 100 includes a computing system 102, enterprise computing systems 104-106, and external data sources 108-110. The computing system 102 is in communication with the enterprise computing systems 104-106 by way of a network 112 and is further in communication with the external data sources 108-110 by way of the network 112. While the computing system 102 is illustrated as being in communication with the enterprise computing systems 104-106 and the data sources 108-110 by way of the network 112, it is to be understood that the computing system 102 may be in communication with one or more of the enterprise computing systems 104-106 and/or one or more of the external data sources 108-110 by way of different networks.

The enterprise computing systems 104-106 are representative of computing systems of different enterprises. While the enterprise computing systems 104-106 are illustrated as functional blocks in FIG. 1, it is understood that the enterprise computing systems 104-106 are relatively complex computing systems, where one or more of the enterprise computing systems 104-106 may include several different computing devices located in different public or private data centers, where the data centers may be geographically dispersed. Therefore, for instance, the first enterprise computing system 104 may include proprietary code written in several different programming languages that correspond to numerous computer-executable modules, where a function in the code is configured to pass data to and/or consume data from another function in the code. Therefore, a computer-executable module in the computer-executable modules passes data to and/or consumes data from another computer-executable module in the computer-executable modules.

The external sources 108-110 can be any suitable sources of data that are available to the public. For example, the first external source 108 may be a webpage that includes text, where the text can be extracted from the webpage. In another example, the first external source 108 may be a data repository that includes metadata about a computer-executable application, where the metadata can be retrieved by the computing system 102 by way of an application programming interface (API) call. In yet another example, the first external data source 108 may be or include a database that retains information about organizations, where the information may include identities of officers of the organizations, contact information for people who work in the organizations, a description of business conducted by the organizations, amongst other data about the organizations.

The computing system 102 includes a processor 114 and memory 116, where the memory 116 includes instructions that are executed by the processor 114. Specifically, the memory 116 includes an enterprise data collection system 118, a global data collection system 120, and a processing record generator system 122. The computing system 102 additionally includes a data store 124 that can retain data obtained from the enterprise computing systems 104-106 and the external sources 108-110. As illustrated in FIG. 1, the data store 124 includes first enterprise data 126 through nth enterprise data 128, where the enterprise data 126-128 respectively corresponds to the enterprise computing systems 104-106. As will be described in greater detail herein, the enterprise data 126-128 is obtained from the enterprise computing systems 104-106 and includes information that is proprietary to the enterprise computing systems 104-106 (and therefore not generally available to the public). Such information can be information obtained based upon analysis of source code of one or more applications executing on computing devices of the enterprise computing systems 104-106, infrastructure information that is indicative of modules installed on the enterprise computing systems 104-106 and communications between such modules, and information extracted from computer-readable documents of the enterprise computing systems 104-106, such as computer-readable contracts, data privacy policies, amongst other computer-readable documents. The external data 130 represents data that is obtained from the external sources 108-110. While the external data 130 is depicted as a single portion of data that represents all data obtained from the external data sources 108-110, it is to be understood that the external data 130 may be partitioned such that data obtained from the different external sources 108-110 is stored separately from one another.

Generally, the enterprise data collection system 118 is configured to obtain information that is proprietary to enterprises that correspond to the enterprise computing systems 104-106, respectively. As will be described in greater detail herein, and referring to the first enterprise computing system 104, the enterprise data collection system 118 can collect data pertaining to the first enterprise computing system 104 by analyzing source code used in the enterprise computing system 104 (through static or dynamic analysis of the source code). In addition, the enterprise data collection system 118 can collect data pertaining to the first enterprise computing system 104 by analyzing software and hardware infrastructure of the first enterprise computing system 104. In yet another example, the enterprise data collection system 118 can collect data pertaining to the first enterprise computing system 104 by analyzing computer-readable documents retained in computer-readable storage of the first enterprise computing system 104. The computer-readable documents can include contracts between the enterprise and software vendors utilized by the enterprise in the enterprise computing system 104. In another example, the computer-readable documents include policies retained in computer-readable storage of the first enterprise computing system 104, where the policies may include data protection requirements, policies, data security policies, and so forth. At least some of the data collected by the enterprise data collection system 118 pertains to the first enterprise computing system 104 processing data that relates to a person (personal data).

With continued reference to the first enterprise computing system 104, the global data collection system 120 is configured to obtain information from the external sources 108-110 that is related to the first enterprise computing system 104. For instance, the first enterprise computing system 104 may include a function that calls an application provided by a software vendor that receives personal data from a module of the enterprise computing system 104. The first external source 108 may be a computer-readable storage device that retains metadata about such application, and the global data collection system 120 can retrieve the metadata by making an API call to the first external source 108. In another example, a comment in source code of the first enterprise computing system 104 may indicate that data is being transmitted to a third-party service, and the comment may identify the third-party service. The first external source 108 may be a website that corresponds to the third-party service, and the global data collection system 120 can obtain text that is related to the first enterprise computing system 104 from webpages of such website. Such information may include text that describes operation of the third-party application, identities of officers of an organization that provides the third-party software, and so forth.

In summary, then, the global data collection system 120 is configured to obtain information from the external sources 108-110 that is publicly available and is germane to the first enterprise computing system 104, where the global data collection system 120 can utilize information acquired by the enterprise data collection system 118 in connection with obtaining appropriate data from the external sources 108-110. For instance, the enterprise data collection system 118 can ascertain that a third-party application is utilized by the first enterprise computing system 104, and the global data collection system 120 can perform a web scrape for information about the provider of such application. Thus, the first enterprise data 126 includes information obtained about the first enterprise computing system 104 by the enterprise data collection system 118, and the external data 130 includes data that is related to the first enterprise computing system 104, where the data is obtained by the global data collection system 120 from the external sources 108-110.

The processing record generator system 122 is configured to receive a request from an operator of the first enterprise computing system 104 to generate a data processing record, where the data processing record is to include information pertaining to processing of data by the first enterprise computing system 104 that is of a predefined type. In an example, the data processing record is to include information pertaining to processing of data by the first enterprise system 104 that is related to a person, persons, and/or household. For instance, the received request can be for a data processing record that is usable by an enterprise (that controls the first enterprise computing system 104) in connection with a request for a ROPA set forth by a regulator to the enterprise. The processing record generator system 122, in response to receipt of the request, generates a data processing record 132 that includes data pertaining to the processing of the data (e.g., about the person, persons, and/or household) by the first enterprise computing system 104. The processing record generator system 122 generates the data processing record 132 based upon the first enterprise data 126 and a portion of the external data 130 that relates to the first enterprise computing system 104. Therefore, the processing record generator system 122 generates the data processing record 132 based upon data acquired from multiple different sources of data, where the multiple different sources of data include information that is proprietary to the enterprise that controls the first enterprise computing system 104 (e.g., information obtained from source code, infrastructure data, data from computer-readable documents of the enterprise) and information that is available to the public (e.g., information obtained from exposed APIs, information obtained from webpages, etc.). An example structure of the data processing record 132 is set forth in greater detail below.

While the examples set forth herein have related to the first enterprise computing system 104, it is emphasized that the computing system 102 can be configured to generate data processing records for any of the enterprise computing systems 104-106 that issue a request for a data processing record. For instance, as indicated above, the computing system 102 is configured to acquire the nth enterprise data 128, and a portion of the external data 130 may pertain to the nth enterprise computing system 106. The computing system 102 can receive, from a computing device of the nth enterprise computing system 106, a request for a data processing record, and the processing record generator system 122 can construct a data processing record for the nth enterprise computing system 106 based upon: 1) the nth enterprise data 128; and 2) the portion of the external data 130 that pertains to the nth enterprise computing system 106.

In an example, the enterprise data collection system 118 can obtain enterprise data for the nth enterprise computing system 106 upon receipt of a request for a data processing record from the nth enterprise computing system 106. Additionally or alternatively, the enterprise data collection system 118 can obtain enterprise data for the nth enterprise computing system 106 periodically and/or upon integration with the computing system 102. In another example, the global data collection system 120 can obtain external data from one or more of the external sources 108-110 upon receipt of a request for a data processing record from the nth enterprise computing system 106 (where the obtained external data can be obtained based upon obtained enterprise data that relates to the nth enterprise computing system 106). Additionally or alternatively, the global data collection system 120 can acquire external data periodically (e.g., through periodic web scrapes).

The computing system 102 exhibits various advantages over conventional approaches for generating data processing records based upon requests for ROPAs from regulators. The computing system 102 automatically constructs data processing records based upon information from a variety of different data sources, thereby allowing the data processing records to be constructed with relatively high accuracy. As described previously, these data sources include both information that is proprietary and not available to the general public and information that is available to the general public. Further, the computing system 102 is able to generate data processing records even when an enterprise computing system is complex, such as when the enterprise computing system includes code developed by an enterprise that controls the enterprise computing system, and the code passes data to third-party applications.

With reference now to FIG. 2, a table 200 that illustrates information pertaining to a data processing record that is generated by the processing record generator system 122 is presented. The table 200 includes four separate columns: 1) a first column 202 that comprises identifiers for fields of a data processing record; 2) a second column 204 that identifies types of information that correspond to the fields in the first column 204; 3) a third column that identifies data sources used by the processing record generator system 122 to populate the fields in the second column 202 when processing of, for example, personal data is performed by a vendor; and 4) a fourth column that identifies data sources used by the processing record generator system 122 to populate the fields in the second column 202 when processing of, for example, personal data is performed by a service. A vendor is a computer-implemented system that receives data of a predefined type (e.g., personal data) from an enterprise computing system, such as the first enterprise computing system 104, and processes the data on behalf of an enterprise that controls the first enterprise computing system 104. In an example, a module of the first enterprise computing system 104 passes personal data of employees of the enterprise to a third-party vendor, which performs processing pertaining to payroll of the employees. The enterprise, when responding to a request for a ROPA, may be required to indicate that the first enterprise computing system 104 processes personal data, even though such processing is in actuality performed by a vendor of the first enterprise computing system 104. Accordingly, a data processing record generate on behalf of the enterprise desirably indicates that the first enterprise computing system 104 processes personal data, such that the enterprise can use the data processing record when responding to the request for the ROPA.

A service is a computer-implemented module that executes in an enterprise computing system for which a data processing record is to be generated by the processing record generator system 122. Thus, with reference to the example set forth above, rather than transmitting personal data to a third-party service to perform payroll functions, the first enterprise computing system 104 may include a computer-executable module that performs such processing within the first enterprise computing system 104. It can be ascertained that identifying parameters relating to processing of personal data potentially requires different data sources when the module that processes the personal data is controlled by a vendor versus when the module that processes the personal data is performed by a module developed and controlled by the enterprise, and thus executes in an enterprise computing system.

A brief description of the data sources referenced in the third column 206 and 208 of the table 200 is now set forth. The "database" refers to a database that can be maintained by operators of the computing system 102; the database can include information collected by operators of the computing system 102 over time, including information known about vendors that provide modules that execute personal data, including type of processing such vendors perform on personal data, information about safeguards used by the vendors to protect personal data, relationships between vendors learned by the operators of the computing system 104 based upon experience, etc. A "privacy policy" is a computer-readable document maintained by an enterprise computing system (e.g., the first enterprise computing system 104) that describes a data privacy policy of the enterprise and/or describes a data privacy policy of the vendor. A "contract" refers to a computer-readable document maintained on the first enterprise computing system 104 between the enterprise and the vendor. "APIs" refer to Application Programming Interfaces called by functions of code executing on the first enterprise computing system 104, where information can be obtained by way of such APIs, such as metadata made available by a vendor, an endpoint name, and so forth. "Source Code Info" refers to information obtained from static or dynamic analysis of source code of the first enterprise computing system 104. "Infrastructure" refers to information obtained based upon an observed infrastructure of the first enterprise computing system 104 (where infrastructure refers to modules of the first enterprise computing system 104 and communication paths between the modules). "Vendor ID" refers to an identity of a vendor that provides a computer-executable service that is called by a module of the first enterprise computing system 104. "Service Information" refers to information the computing system obtains from the enterprise when the first enterprise computing system 104 is integrated with the computing system 102; for instance, service information can be manually provided by the enterprise at the time of integration. "Web Sources" refers to information that is retrievable by way of the World Wide Web—for instance, such information can be obtained by way of automated web scraping.

"Internal Data" refers to data provided by the enterprise to the computing system 102, such as an identity of a data protection officer. "Dev" refers to information related to the first enterprise computing system 104 obtained from a service that hosts cloud-based tools for software development, and "Authentication" refers to information related to the first enterprise computing system 104 obtained from a service that provides authentication and access management to the first enterprise computing system 104. "Learned Relationships" refers to information that the provider of the computing system 102 is aware of between, for example, an identity of a vendor application and services provided by way of the vendor application. "Policy Documents" refers to internal policy documents of the enterprise that controls the first enterprise computing system 104. "Vendor Integrations" refers to information obtained based upon the computing system 102 integrating with vendor systems, including information retained in data warehouses and data lakes by the vendor systems that is accessible to the computing system 102 when integrating with the first enterprise system 104. "Vendor Information" refers to information known about the vendor, such as other services and/or entities with which a vendor is known to share data.

It is to be understood that the table 200 is set forth as an example, and that the table can include additional fields pertaining to information that is unique to a data controller and fields that are unique to a data processor. Moreover, the processing record generator system 122 can employ data in addition to what is shown in the table to populate entries in a data processing record. From reviewing the table 200, however, it can be ascertained that the processing record generator system 122 can use multiple different signals received from multiple different data sources to populate entries in a data processing record, where the data processing record can be employed by an enterprise in connection with responding to a request from a regular for a ROPA.

Referring now to FIG. 3, a functional block diagram of the processing record generator system 122 is illustrated. The processing record generator system 122 receives an identifier for a field in the data processing record 132 that is to be populated, and further receives and/or obtains information from various sources in connection with populating the identified field in the data processing record 132. In some embodiments, at least a portion of the information received by the processing record generator system 122 is obtained before the processing record generator system 122 requests the information. For instance, source code information, infrastructure information, information obtained from web scraping, etc. may be obtained by the computing system 102 prior to the processing record generator system 122 receiving the identifier for the field (and thus prior to the processing record generator system 122 requesting such information). Additionally or alternatively, the processing record generator system 122 can obtain information in response to receiving a request for a data processing record. In an example, the processing record generator system 122 can call an API to acquire an endpoint name in response to receiving a request for a data processing record.

The processing record generator system 122 includes rules 302 and computer-implemented models 304, wherein the processing record generator system 122 generates the data processing record 132 based upon the rules 302 and/or the computer-implemented models 304. At least one field illustrated in the table 200 can have a rule associated therewith, wherein an entry for the field can be computed based upon application of the rule to information obtained by the processing record generator system 122. The rule generates an output based upon multiple pieces of information obtained from different sources. Further, the rule may be conditional, and the rule may fire depending upon an output of another rule. In another example, the rule may operate as a filter, such that certain information is removed by the rule. The rules can be learned based upon experience in the industry, through mining information pertaining to enterprise computing systems, etc.

The computer-implemented models 304 are machine-learning models, where the processing record generator system 122 populates a field of the data processing record 132 based upon output of one or more of the computer-implemented models. In an example, the computer-implemented models can include a support vector machine (SVM) that is configured to receive text (e.g., from a computer-readable contract) and classify such text as belonging to a particular class. In a specific example, the SVM can classify text in a computer-readable contract as pertaining to a data retention policy. The computer-implemented models 304 can further include linguistic models that can parse text and determine semantic meaning of such text (and extract appropriate values therefrom). For example, a computer-implemented model can receive the portion of text classified as pertaining to a data retention policy, and the computer-implemented model can ascertain that the portion of text includes the text "3 years." The computer-implemented model can populate the field in the data processing record 132 that pertains to the data retention policy with the identified text. An exemplary linguistic model that can be included in the computer-implemented models 304 can be a Bidirectional Encoder Representations from Transformers (BERT) model.

In summary, then, for various fields of a data processing record that pertains to an enterprise computing system processing a predefined type of data (such as personal data), the processing record generator system 122 can receive and/or obtain information from multiple different sources (information that is proprietary and private to the enterprise computing system and information that is publicly available), and through application of the rules 302 and/or computer-implemented models 304 to the received and/or obtained information, can generate the data processing record 132, where the processing record includes fields that are populated with values that are configured to assist the enterprise with responding to a request for a ROPA (and regardless of the jurisdiction associated with the initiator of the request).

Figure 4:
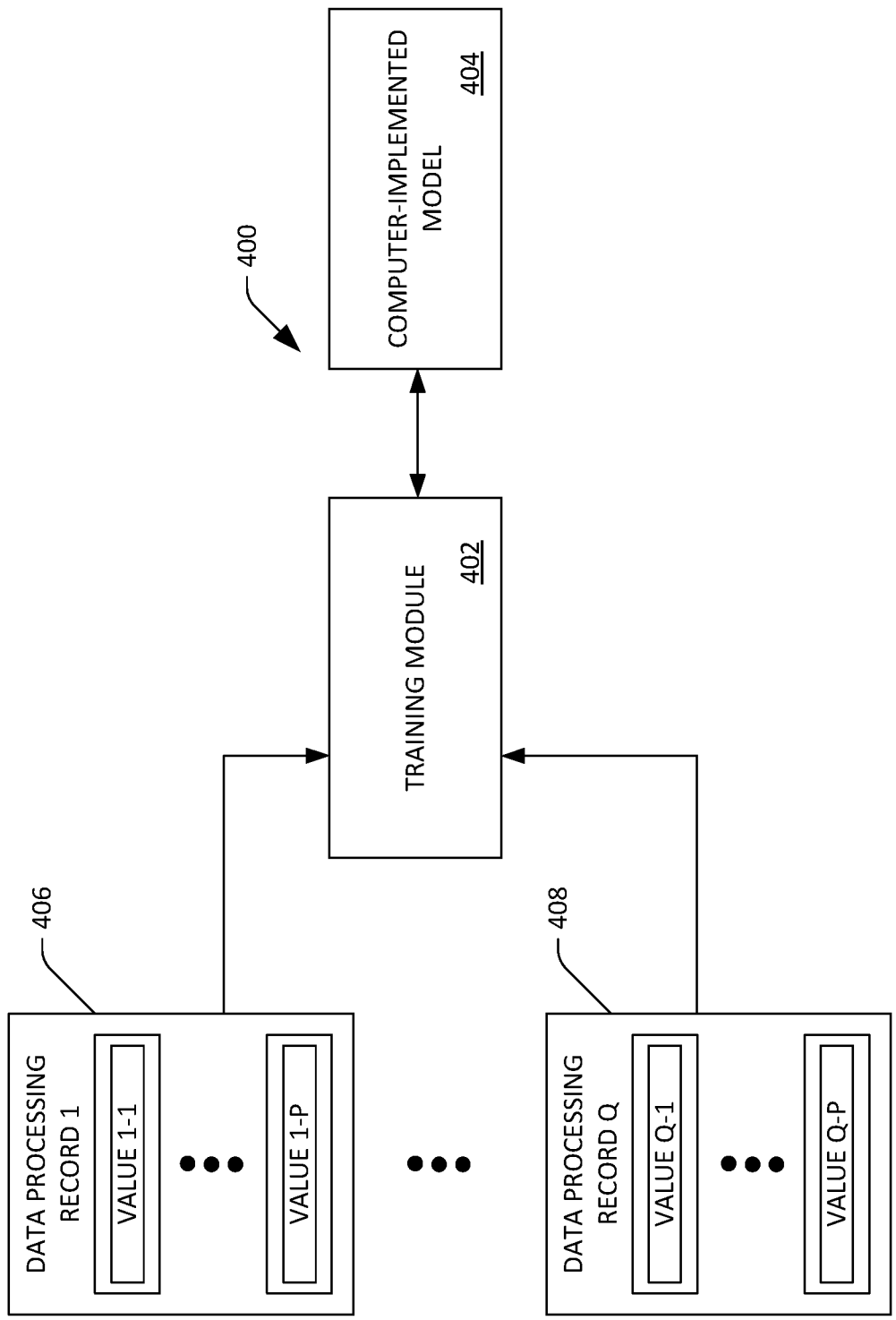
FIG. 4 is a functional block diagram of a computing system that is configured to train a machine-learning model to identify relationships between fields of data processing records and then make predictions of the data fields

Now referring to FIG. 4, a functional block diagram of a system 400 that is configured to train a machine learning model is illustrated, wherein once trained, the machine learning model can infer values for fields of a processing record. The system 400 includes a training module 402 that is configured to train/learn a machine learning model 404 based upon several data processing records 406-408. As depicted in FIG. 4, the training module 402 can receive the data processing records 406-408, wherein each of the data processing records 406-408 includes P fields. At least some of the P fields in each of the data processing records 406-408 are populated with values.

Based upon the values in the P fields of the data processing records 406-408, associations between values in fields can be ascertained, wherein the machine learning model 402, once trained, can populate a value of a field in a data processing record based upon one or more of the learned associations. In a non-limiting example, when a first field of a data processing record has a first value, the machine learning model 404 can infer that a second field in the data processing record has a second value (based upon the first field having the first value). In a specific example, based upon the data processing records 406-408, it can be ascertained that a particular value in the "purpose of processing" field typically is associated with a particular value in the "personal data categories" field. This relationship can be learned, for example, based upon statistical analysis of values in the data processing records 406-408. Therefore, the machine learning model 404 can be a Bayesian model, a neural network, a relational model, or the like.

Further, the machine learning model can be a probabilistic model that probabilistically populates fields in a data processing record based upon values of other fields in the data processing record (where the fields are populated based upon the learned relationships between the fields). In such an example, the data processing record can include values and associated probability labels, thereby indicating to a reviewer a confidence in the value. Therefore, when there is a value with relatively low probability, the reviewer can confirm the value prior to submitting the value as part of a ROPA.

Figure 5:
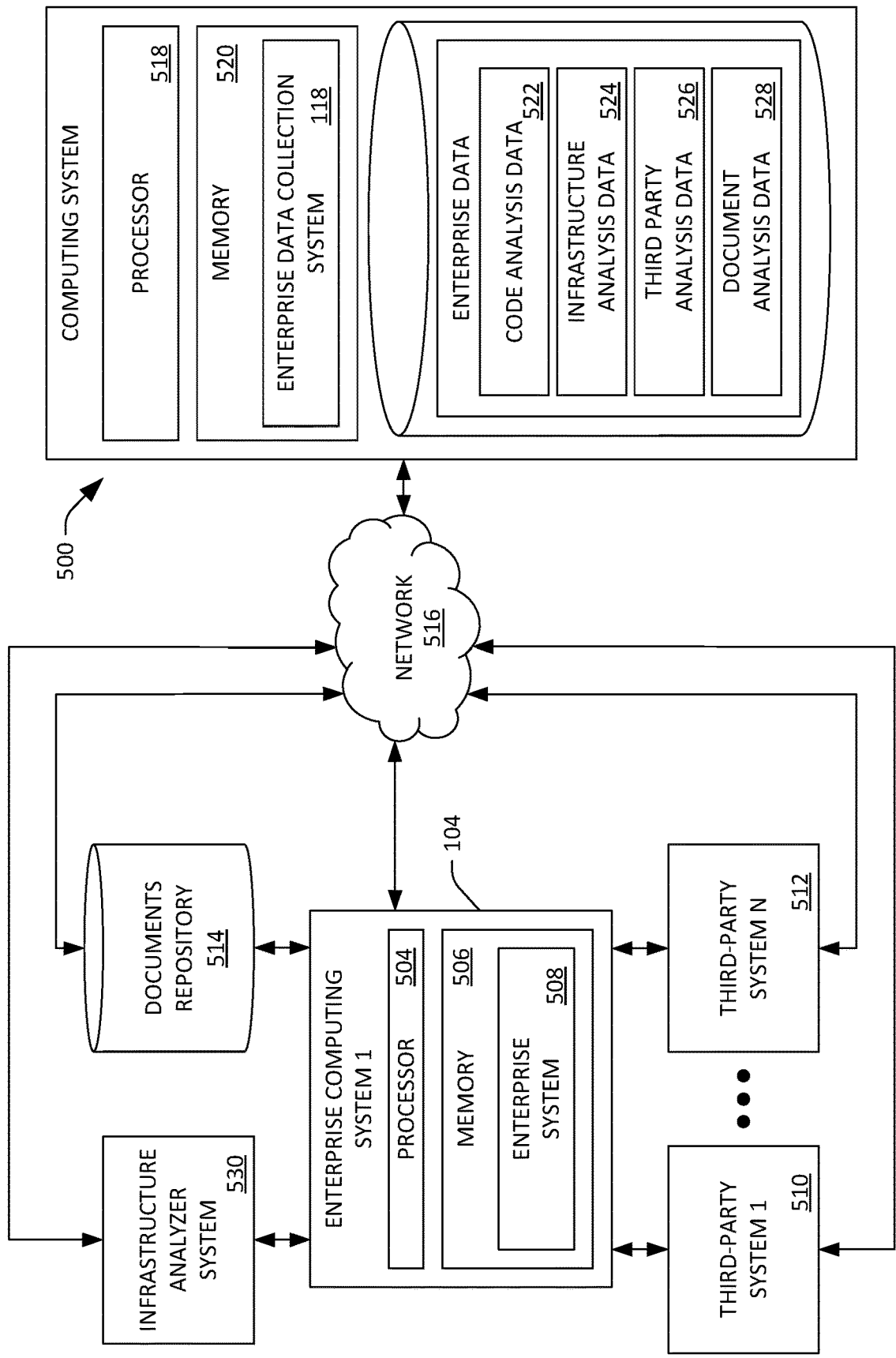
FIG. 5 is a functional block diagram of an exemplary computing system that is figured to obtain information that is unique and proprietary to an organization, where the information is employed to generate a data processing record that indicates that the computing system of the organization processes data about a person, persons, household, etc.
Figure 6:
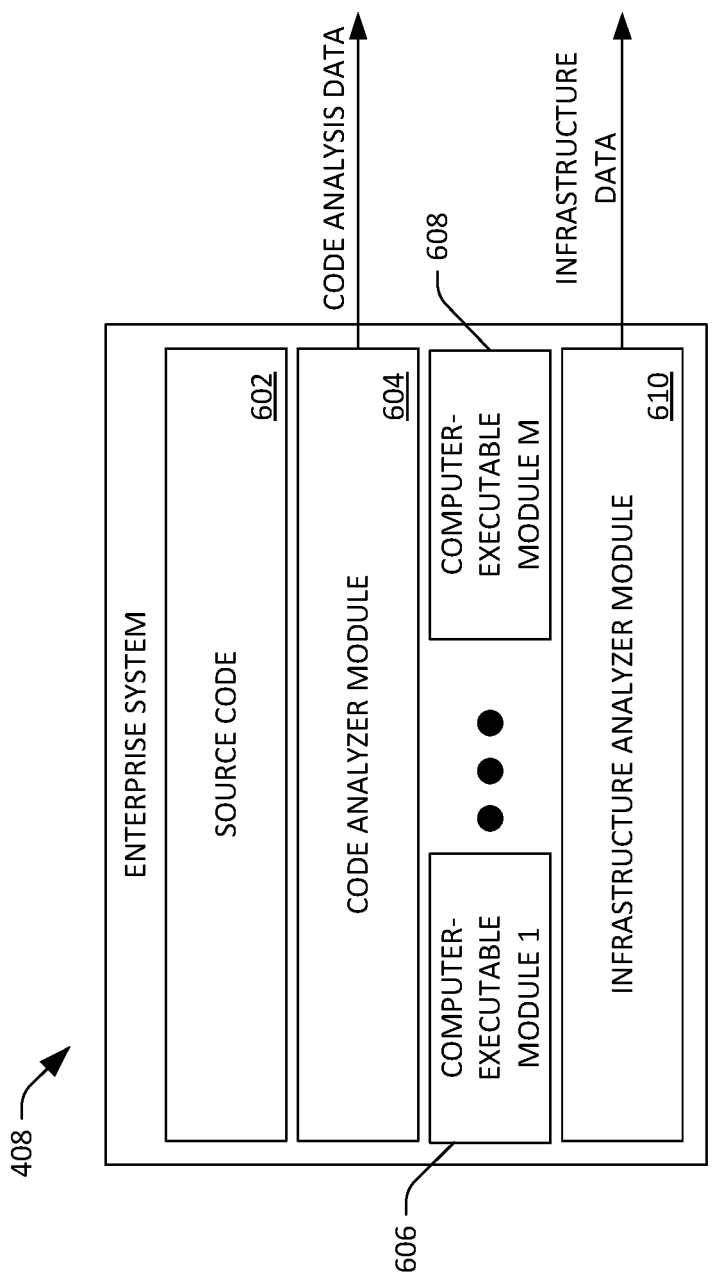
FIG. 6 is a functional block diagram of an enterprise system that is configured to obtain data pertaining to source code of a computing system of an organization and data pertaining to infrastructure of the computing system of the organization, where such data is employed to generate a data processing record that indicates that the computing system of the organization processes data about a person, persons, household, etc.

FIGS. 5 and 6 are set forth to describe mechanisms used by the enterprise data collection system 118 in connection with obtaining information that is proprietary to an enterprise computing system (and on behalf of the enterprise computing system). FIG. 5 illustrates a functional block diagram of a computing system 500 that is configured to obtain information pertaining to how an enterprise computing system processes data of a predefined type, such as personal data. The computing system 500 includes the first enterprise computing system 104, where the first enterprise computing system includes at least one processor 504 and memory 506, where the memory 506 includes an enterprise system 508 that is subject to analysis. While the first enterprise computing system 104, the at least one processor 504, the memory 506, and the enterprise system 508 are illustrated as individual functional blocks, it is to be understood that the first enterprise computing system 104 may be a relatively complex computing system that includes several different computing devices located in different public or private data centers, where the data centers may be geographically dispersed. As will be described in greater detail herein, the enterprise system 508 may include proprietary code written in different programming languages that correspond to numerous computer-executable modules, where a function in the code is configured to pass data to and/or consume data from another function in the code. Therefore, a computer-executable module in the computer-executable modules passes data to and/or consumes data from another computer-executable module in the computer-executable modules.

The first enterprise computing system 104 is in network communication with a plurality of third-party systems 510-512, where the third-party systems 510-512 operate outside of the control of the enterprise that manages the first enterprise computing system 104. In a non-limiting example, the first third-party system 510 may be a telecommunications system, and the nth third-party system 512 may be a customer relationship management (CRM) system. In an example, the first third-party system 510 consumes data output by a first computer-executable module of the enterprise system 508 and passes data to a second computer-executable module of the enterprise system 508. In summary, then, when executed by the processor 504, computer-executable modules (such as microservices) of the enterprise system 508 can pass data to and/or consume data from other computer-executable modules of the enterprise system 508 and/or third-party systems, and third-party systems can pass data to and/or consume data from computer-executable modules of the enterprise system 508 and/or other third-party systems.

The first enterprise computing system 104 is depicted in FIG. 1 as being in communication with a documents repository 514, where the documents repository 514 stores computer-readable documents of the enterprise. While the documents repository 514 is illustrated as being separate from the first enterprise computing system 104, in another example, the documents repository 514 is included in the first enterprise computing system 104. The computer-readable documents stored in the document repository 514 may include contracts between the enterprise and other organizations (e.g., vendors), contracts between the enterprise and individual customers, internal policies of the enterprise, compliance related documentation such as compliance summaries, questionnaires, and audit reports, computer-readable marketing material for the enterprise, etc. The computer-readable documents may include information relating to the enterprise, where the information can include constraints on the enterprise system 508 with respect to processing data of a predefined type (e.g., personal data) as well as other information related to the data of the predefined type. In an example, a computer-readable document in the documents repository 514 may include a constraint that specifies that the enterprise system 508 is prohibited from retaining personal data beyond some set time limit (e.g., 3 years). In another example, the documents repository 514 may include publicly available marketing material that includes a constraint on the enterprise system 508 in regard to storing financial information (e.g., the marketing material notes that the enterprise system 508 does not retain financial information of customers of the organization).

The computing system 500 is in communication with the first enterprise computing system 104 by way of a network 516 (e.g., the Internet). In addition, the computing system 500 is in communication with the third-party systems 510-512 and the documents repository 514 by way of the network 516. The memory 520 of the computing system 500 includes data that is accessed by the processor 518 and instructions that are executed by the processor 518. As illustrated in FIG. 1, the memory 520 includes code analysis data 522 and infrastructure analysis data 524. The memory 520 further includes third-party analysis data 526 and document analysis data 528. The code analysis data 522, the infrastructure analysis data 524, the third-party analysis data 526, and the document analysis data 528 are described in turn, and can be used by the processing record generator system 122 in connection with generating data processing records for the enterprise.

The code analysis data 522 is data that indicates that a function in the code of the enterprise system 508 passes data of a predefined type to another function of the code of the enterprise system 508 or a third-party system (e.g., at least one of the third-party systems 510-512). As noted previously, the data of the predefined type can be data that relates to a person, persons, and/or a household, such as a name, an email address, a telephone number, a home address, a work address, a gender, age, financial information, IP address, etc. These functions in the code of the enterprise system 508, when compiled, correspond to computer-executable modules, such as microservices.

The infrastructure analysis data 524 is data that identifies runtime information about the enterprise system 508. For example, the infrastructure analysis data 524 identifies executing computer-executable modules of the enterprise system 508, connections between different computer-executable modules of the enterprise system 508, endpoints of the enterprise system 508, etc. Further, for instance, the infrastructure analysis data 524 indicates that a first computer-executable module of the enterprise system 508 passes data to a second computer-executable module of the enterprise system 508 at runtime; however, the infrastructure analysis data 524 is silent as to type and format of the data passed from the first computer-executable module to the second computer-executable module. The infrastructure analysis data 524 can be based upon output of an infrastructure analyzer system 530 utilized by the first enterprise computing system 104, where the infrastructure analyzer system 530 is configured to provide infrastructure information to the enterprise about the first enterprise computing system 104, such as latency associated with computer-executable modules, information about crashes that occurred in the enterprise system 508, throughput with respect to one or more computer-executable modules, etc. As illustrated in FIG. 5, the computing system 500 is in communication with the infrastructure analyzer system 530, and the computing system 500 can generate the infrastructure analysis data 524 based upon output of the infrastructure analyzer system 530 (where the infrastructure analyzer system 530 continuously monitors operation of the enterprise system 508).

The third-party analysis data 526 is data that identifies, for one or more of the third-party systems 510-512, different types of data (from amongst several predefined types) passed to the one or more third-party systems 510-512 by the enterprise system 508. In an example, the third-party analysis data 526 indicates that the first third-party system 510 receives email addresses of people, telephone numbers of the people, and names of the people from the enterprise system 508.

The document analysis data 528 includes information specified in computer-readable documents of the organization with respect to data of a predefined type (e.g., personal data and/or a particular type of personal data), including one or more constraints on the enterprise system 508 with respect to the data of the predefined type. As indicated previously, the document analysis data 528 is based upon information included in computer-readable documents of the documents repository 514, where natural language processing (NLP) technologies are employed to identify and summarize the information included in the computer-readable-documents.

In an example, the code analysis data 522, the infrastructure analysis data 524, and the third-party analysis data 526 are updated at each build of code of the enterprise system 508. Further, since the infrastructure analysis data 524 is generated based upon output of the infrastructure analysis system 530, which continuously monitors infrastructure of the enterprise system 508, the infrastructure analysis data 524 can be continuously updated. The third-party analysis data 526 is updated by, for example, querying the third-party systems 510-512 to acquire information in schemas exposed by the third-party systems 510-512. Therefore, each time that the processing record generator system 122 receives a request for a processing record, the processing record generator system 120 is generating the processing record 132 based upon current operation of the enterprise system 508.

Now referring to FIG. 6, a functional block diagram that depicts contents of the enterprise system 508 is illustrated. The enterprise system 508 includes source code 602, where the source code 602 may include numerous files, with each file including source code, and where code in different files may be written in different languages. The enterprise system 508 further includes a code analyzer module 604 that is configured to perform a static analysis over the source code 602 and, based upon the static analysis, output the code analysis data 522 to the computing system 500. In an example, the code analyzer module 604 is provided to the enterprise system 508 by the computing system 500. For instance, a developer for the organization may place a pointer to the code analyzer module 604 at an end of a build pipeline with respect to the source code 602. Thus, when a build is performed, the code analyzer module 604 is retrieved by the enterprise system 508 and executes over the source code 602. It is therefore noted that the computing system 500 itself does not obtain access to the source code 602 of the first enterprise computing system 104.

In connection with generating the source code analysis data 522, the code analyzer module 604 can employ build files corresponding to the source code 602 to develop build dependencies. The code analyzer module 604, for each file, can construct an abstract syntax tree (AST) and can thereafter generate a control flow graph (CFG) based upon the AST. Based upon the CFG for a file, the code analyzer module 604 may generate a nested data structure that includes function definitions and function calls for the file. The code analyzer module 604 then traces arguments and targets of function calls with the CFG and traces formal returns of function definitions with the CFG. The code analyzer module 604 subsequently matches a path/module and name (and formal parameters in languages with overloading) of a function call with its definition. The code analyzer module 604 may then classify function calls as "pure" or "impure", where "pure" refers to a function call to an internal service and "impure" refers to a function call to a third party (e.g., a microservice provided by an external entity and/or one of the third-party systems 510-512), and the code analyzer module can trace impure function calls. The code analyzer module 604 detects data of predefined types and direction of data for impure calls by tracing arguments and targets of impure calls globally with a call graph; the data flow direction is classified from the function name and whether data of the predefined type was detected in arguments or targets. The source code analysis data 522 output by the source code analyzer module 604 can be a nested data structure containing, for each file in the source code 602, computer-executable modules that the file is a part of and each function call to a third-party computing system or computer-executable module including the third-party computing system or computer-executable module key, the type and direction of communication, and subtypes of predefined types of data (e.g., types of personal data exchanged).

While the source code analyzer module 604 has been described herein as performing a static analysis to construct the code analysis data 522, other approaches are contemplated. For example, dynamic analysis can be performed on the source code 602 in order to obtain the source code analysis data 522.

The enterprise system 508 further includes several computer-executable modules 606-608 that are based upon the source code 602. As described previously, the modules 606-608 are executed by the processor 504 of the first enterprise computing system 104 at runtime. The enterprise system 508 further includes an infrastructure analyzer module 610 that monitors runtime operations of the first enterprise computing system 104, including runtime operations of the modules 606-608, and outputs infrastructure data based upon the monitoring of the runtime operations. The infrastructure analyzer module 510 is provided to the first enterprise computing system 502 by the infrastructure analyzer system 530. For instance, there are numerous computer-implemented services that are configured to monitor infrastructure of organizations to ensure that computing systems of the organizations are operating as desired by the organizations. Therefore, the infrastructure analyzer module 610 provides a runtime environmental view of the enterprise system 508. Information that may be included in the infrastructure data output by the infrastructure analyzer module includes logs, network connectivity, runtime data payload exchanges, connections between computer-executable modules, etc.

As indicated above, FIGS. 5 and 6 have been presented in connection with describing how the enterprise data collection system 118 can obtain data about the first enterprise computing system 104 with respect to source included in such system 104, infrastructure corresponding to the computing system 104, etc. The processing record generator system 122 uses such information when generating the processing record 132, as described above.

Figure 7:
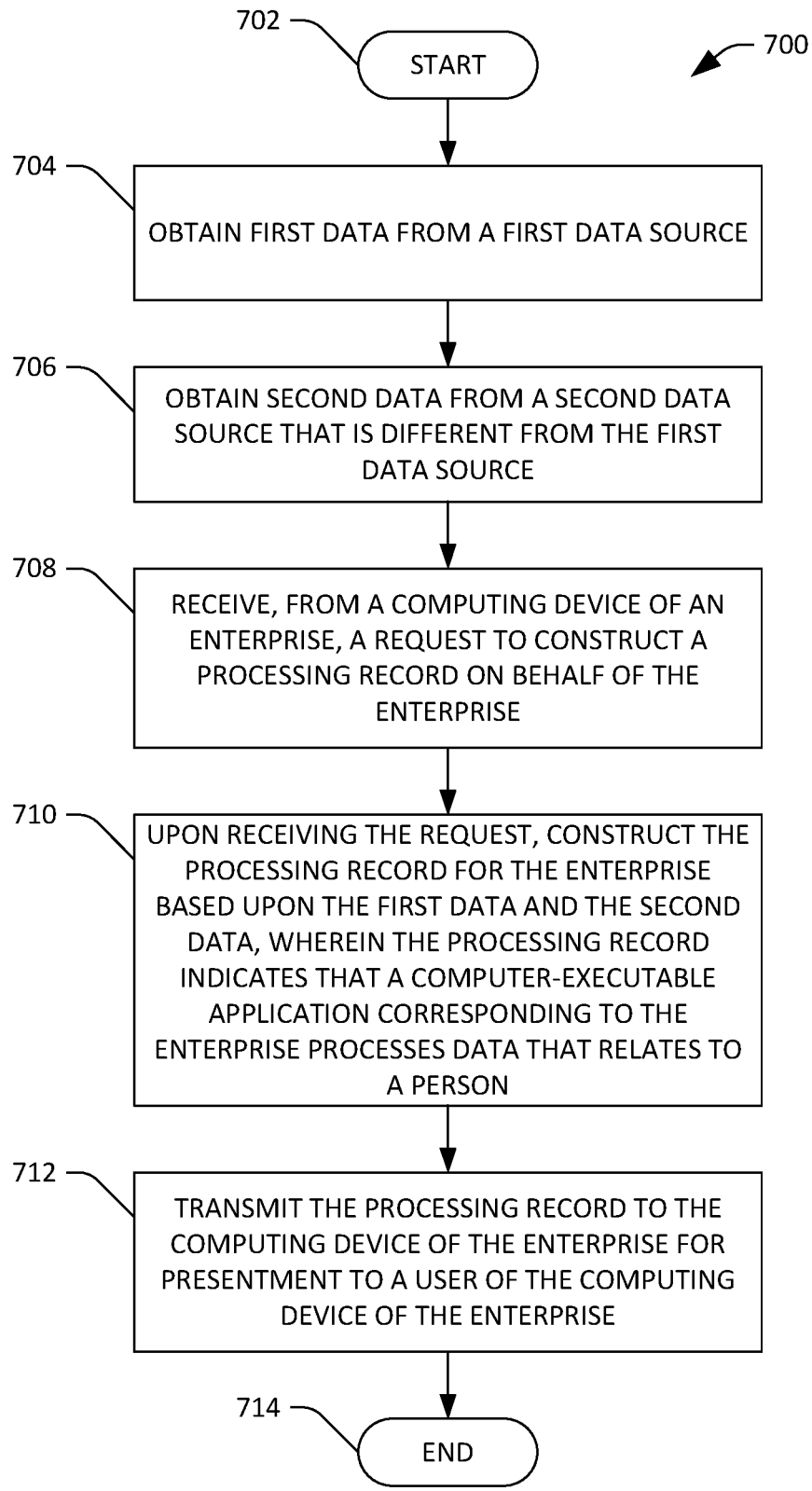
FIG. 7 is a flow diagram that illustrates an exemplary methodology for constructing a data processing record that indicates that a computing system of an organization processes data relating to a person, persons, a household, etc.

FIG. 7 illustrates a methodology relating to generating a data processing record that can be provided based upon a request for a ROPA. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a subroutine, programs, a thread of execution, and/or the like. Still further, results of acts of the methodologies can be stored in a computer-readable medium, displayed on a display device, and/or the like.

The methodology 700 starts at 702, and at 704, first data from a first data source is obtained. The first data source may be source code of an enterprise computing system, infrastructure of the enterprise computing system, a computer-readable document corresponding to the enterprise computing system, a webpage, a computer-readable data storage device that retains information that can be acquired by way of an API call, etc.

At 706, second data is obtained from a second data source that is different from the first data source. The second data source may be source code of an enterprise computing system, infrastructure of the enterprise computing system, a computer-readable document corresponding to the enterprise computing system, a webpage, a computer-readable data storage device that retains information that can be acquired by way of an API call, etc.

At 708, a request for a processing record on behalf of an enterprise is received from a computing device of the enterprise. For instance, the enterprise may have received a request for a ROPA from a regulator, and the enterprise may in turn issue the request for the processing record.

At 710, the processing record is constructed upon receiving the request, where the processing record is constructed based upon the first data and the second data. The processing record indicates that a computing system of the enterprise processes personal data corresponding to a person, persons, and/or household. At 712, the data processing record is transmitted to the computing device of the enterprise for presentment to a user of the computing device. Thus, the processing record is generated "on-demand," such that a response to the regulator can be quickly provided. In addition, the data processing record can be continuously updated based upon monitoring of the information described above. The methodology 700 completes at 714.

Figure 8:
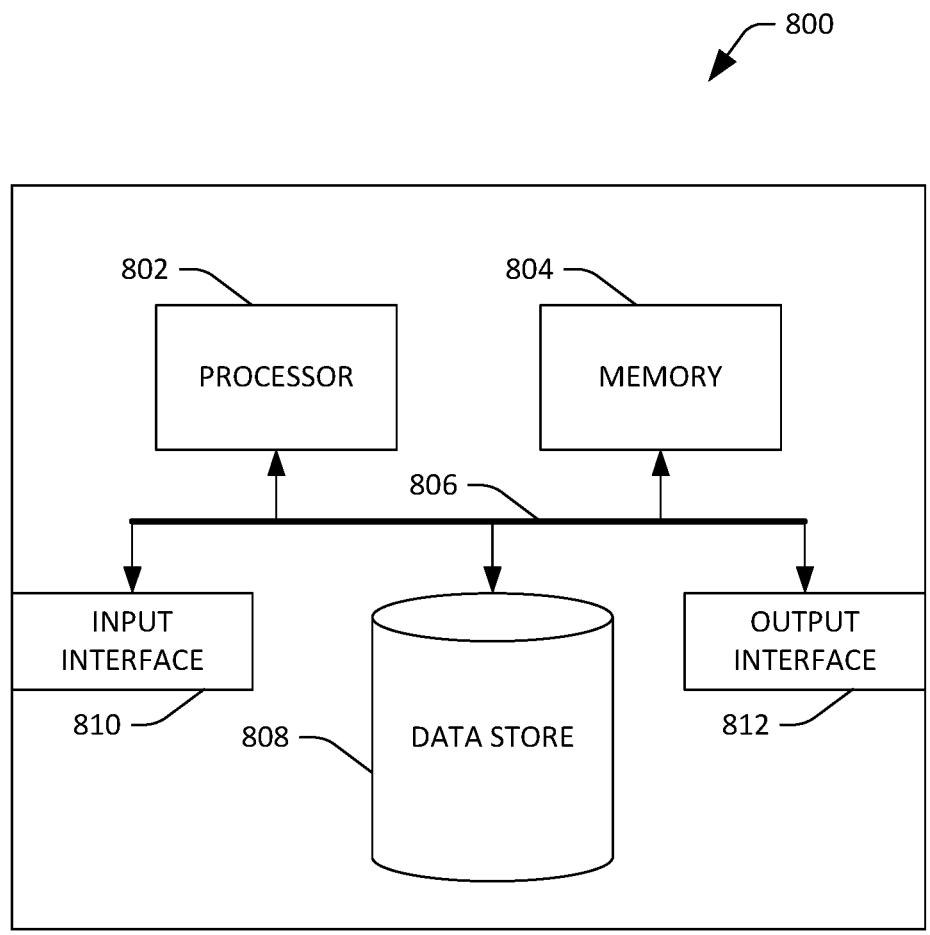
FIG. 8 is an exemplary computing system.

Referring now to FIG. 8, a high-level illustration of a computing device 800 that can be used in accordance with the systems and methodologies disclosed herein is illustrated. For instance, the computing device 800 may be used in a system that supports generating processing records for enterprises. By way of another example, the computing device 800 can be used in a system that is configured to obtain data that is used to generate processing records for enterprises. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store code analysis data, infrastructure analysis data, third-party analysis data, document analysis data, information from webpages, data obtained by calling exposed APIs, etc.

The computing device 800 additionally includes a data store 808 that is accessible by the processor 802 by way of the system bus 806. The data store 808 may include executable instructions, computer-readable documents, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Technologies are described herein that accord to the description above and are represented through the following examples.

(A1) In an aspect described herein, some embodiments include a method, wherein the method includes obtaining first data from a first data source, wherein the first data source is in network communication with the computing system. The method also includes obtaining second data from a second data source, wherein the second data source is in network communication with the computing system, and further wherein the first data source and the second data source are different from one another. The method further includes receiving, from a computing device of an enterprise, a request to construct a data processing record on behalf of the enterprise. The method also includes, upon receiving the request, constructing the data processing record for the enterprise based upon the first data and the second data, wherein the data processing record comprises an entry that indicates that that a computer-executable application corresponding to the enterprise processes data that relates to a person, and further wherein the entry is generated by the computing system based upon the first data and the second data. The method further includes transmitting the data processing record to the computing device of the enterprise for presentment to a user of the computing device of the enterprise.

(A2) In some embodiments of the method of (A1), the first data source is a computer-readable contract between the enterprise and a second enterprise, wherein the first data is text extracted from the computer-readable contract, and further wherein the text indicates that the enterprise computing system processes the data that relates to the person.

(A3) In some embodiments of the method of (A1), the first data source is a computing device of a second enterprise that is different from the enterprise, wherein the first data is metadata about a computer-executable application of the second enterprise, wherein the metadata about the computer-executable application indicates that the computer-executable application processes the data that relates to the person, and further wherein obtaining the first data from the first data source comprises calling an application programming interface (API) of the computer-executable application to obtain the metadata from the computing device of the second enterprise.

(A4) In some embodiments of the method of (A1), the first data source is a webpage that pertains to a computer-executable application used by the enterprise, wherein the webpage comprises text, wherein the first data is the text, wherein the text indicates that the computer-executable application processes the data that relates to the person, and further wherein obtaining the first data from the first data source comprises retrieving the webpage and extracting the text from the webpage.

(A5) In some embodiments of the method of (A1), the first data source is source code of a computer-executable application of the enterprise, wherein the first data is generated based upon a static analysis of the source code.

(A6) In some embodiments at least one of the methods of (A1)-(A5), the entry identifies a type of data processing performed with respect to the data that relates to the person, and further wherein constructing the data processing record comprises identifying the type of data processing from amongst several predefined types of data processing based upon the first data and the second data.

(A7) In some embodiments of at least one of the methods of (A1)-(A5), the entry identifies a purpose of the data processing performed with respect to the data that relates to the person.

(A8) In some embodiments of the method of at least one of the methods of (A1)-(A5), the entry identifies a category of the data from amongst several predefined categories of data.

(A9) In some embodiments of the method of (A1), the first data source is unique to the enterprise and the second data source is publicly accessible.

(A10) In some embodiments of at least one of the methods of (A1)-(A9), the data processing record comprises several entries that are different from one another, and further wherein constructing the data processing record for the enterprise comprises generating the several entries based upon at least one of the first data or the second data.

(A11) In some embodiments of at least one of the methods of (A1)-(A10), constructing the data processing record comprises including the first data and the second data in the data processing record to visually indicate that the entry is based upon the first data and the second data.

(A12) In some embodiments of at least one of the methods of (A1)-(A5), the entry identifies a geographic location of where the data that relates to the person is processed.

(A13) In some embodiments of at least one of the methods of (A1)-(A12), the data processing record comprises a second entry that is generated by the computing system based upon a learned association between a first field that includes the entry and a second field that includes the second entry.

(B1) In another aspect, some embodiments relate to a method for generating a data processing record for an organization. The method includes obtaining data from a data source, where the data source is in network communication with the computing system, and further where the data source is private and proprietary to the organization. The method also includes receiving, from a computing device of the organization, a request to construct the data processing record on behalf of the organization. The method further includes upon receiving the request, constructing the data processing record for the organization. Constructing the data processing record includes generating a first value for a first field of the data processing record based upon the data from the data source, wherein the first value for the first field indicates that data relating to a person is processed by a computing system of the organization. The method also includes generating a second value for a second field of the data processing record, wherein the second value for the second field is generated based upon the first value for the first field.

(B2) In some embodiments of the method of (B1), the data source is a computer-readable contract between the organization and a second organization, wherein the data is text extracted from the computer-readable contract, and further wherein the text indicates that the organization computing system processes the data that relates to the person.

(B3) In some embodiments of at least one of the methods of (B1)-(B2), the method also includes obtaining second data from a second data source, wherein the second data source is in network communication with the computing system, and further wherein the second data source is publicly available, wherein constructing the data processing record for the organization further comprises generating a first value for a first field of the data processing record based upon the second data from the second data source.

(B4) In some embodiments of the method of (B3), the second data source is a webpage that pertains to a computer-executable application used by the organization, where the webpage comprises text, where the second data is the text, where the text indicates that the computer-executable application processes the data that relates to the person, and further where obtaining the second data from the second data source comprises retrieving the webpage and extracting the text from the webpage.

(B5) In some embodiments of at least one of the methods if (B1)-(B4), wherein the data source is source code of a computer-executable application of the organization, wherein the data is generated based upon a static analysis of the source code.

(B6) In some embodiments of at least one of the methods of (B1)-(B5), the entry identifies a type of data processing performed with respect to the data that relates to the person, and further wherein constructing the data processing record comprises identifying the type of data processing from amongst several predefined types of data processing based upon the data.

(C1) In another aspect, some embodiments include a computing system that includes a processor and memory, where the memory stores instructions that, when executed by the processor, cause the processor to perform at least one of the methods disclosed herein (e.g., at least one of the methods of (A1)-(A13) or (B1)-(B6).

(D1) In yet another aspect, some embodiments include a computer-readable storage medium the includes instructions that, when executed by a processor, cause the processor to perform at least one of the methods disclosed herein (e.g., at least one of the methods of (A1)-(A13) or (B1)-(B6).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
    a processor; and
    memory storing instructions that, when executed by the processor, cause the processor to perform acts comprising:
        obtaining first data from a first data source, wherein the first data source is in network communication with the computing system;
        obtaining second data from a second data source, wherein the second data source is in network communication with the computing system, and further wherein the first data source and the second data source are different from one another;
        receiving, from a computing device of an enterprise, a request to construct a data processing record on behalf of the enterprise;
        upon receiving the request, constructing the data processing record for the enterprise based upon the first data and the second data, wherein the data processing record comprises an entry that indicates that that a computer-executable application corresponding to the enterprise processes data that relates to a person, wherein the entry is generated by the computing system based upon the first data and the second data, and further wherein the constructed data processing record indicates whether or not the enterprise complies with at least one of a policy, law, or regulation with respect to processing the data that relates to the person; and
        transmitting the data processing record to the computing device of the enterprise for presentment to a user of the computing device of the enterprise.

2. The computing system of claim 1, wherein the first data source is a computer-readable contract between the enterprise and a second enterprise, wherein the first data is text extracted from the computer-readable contract, and further wherein the text indicates that the enterprise computing system processes the data that relates to the person.

3. The computing system of claim 1, wherein the first data source is a computing device of a second enterprise that is different from the enterprise, wherein the first data is metadata about a computer-executable application of the second enterprise, wherein the metadata about the computer-executable application indicates that the computer-executable application processes the data that relates to the person, and further wherein obtaining the first data from the first data source comprises calling an application programming interface (API) of the computer-executable application to obtain the metadata from the computing device of the second enterprise.

4. The computing system of claim 1, wherein the first data source is a webpage that pertains to a computer-executable application used by the enterprise, wherein the webpage comprises text, wherein the first data is the text, wherein the text indicates that the computer-executable application processes the data that relates to the person, and further wherein obtaining the first data from the first data source comprises retrieving the webpage and extracting the text from the webpage.

5. The computing system of claim 1, wherein the first data source is source code of a computer-executable application of the enterprise, and further wherein the first data is generated based upon a static analysis of the source code.

6. The computing system of claim 1, wherein the entry identifies a type of data processing performed with respect to the data that relates to the person, and further wherein constructing the data processing record comprises identifying the type of data processing from amongst several predefined types of data processing based upon the first data and the second data.

7. The computing system of claim 1, wherein the entry identifies a purpose of the data processing performed with respect to the data that relates to the person.

8. The computing system of claim 1, wherein the entry identifies a category of the data from amongst several predefined categories of data.

9. The computing system of claim 1, wherein the first data source is unique to the enterprise and the second data source is publicly accessible.

10. The computing system of claim 1, wherein the data processing record comprises several entries that are different from one another, and further wherein constructing the data processing record for the enterprise comprises generating the several entries based upon at least one of the first data or the second data.

11. The computing system of claim 1, wherein constructing the data processing record comprises including the first data and the second data in the data processing record to visually indicate that the entry is based upon the first data and the second data.

12. The computing system of claim 1, wherein the entry identifies a geographic location of where the data that relates to the person is processed.

13. The computing system of claim 1, wherein the data processing record comprises a second entry that is generated by the computing system based upon a learned association between a first field that includes the entry and a second field that includes the second entry.

14. A method that is configured generate a data processing record for an organization, the method comprising:
    obtaining data from a data source, wherein the data source is in network communication with the computing system, and further wherein the data source is private and proprietary to the organization;
    receiving, from a computing device of the organization, a request to construct the data processing record on behalf of the organization; and
    upon receiving the request, constructing the data processing record for the organization, wherein constructing the data processing record comprises:
        generating a first value for a first field of the data processing record based upon the data from the data source, wherein the first value for the first field indicates that data relating to a person is processed by a computing system of the organization; and generating a second value for a second field of the data processing record, wherein the second value for the second field is generated based upon the first value for the first field, and further wherein the constructed data processing record indicates whether or not the organization complies with at least one of a policy, law, or regulation with respect to processing the data relating to the person.

15. The method of claim 14, wherein the data source is a computer-readable contract between the organization and a second organization, wherein the data is text extracted from the computer-readable contract, and further wherein the text indicates that the organization computing system processes the data that relates to the person.

16. The method of claim 14, further comprising:
obtaining second data from a second data source, wherein the second data source is in network communication with the computing system, and further wherein the second data source is publicly available, wherein constructing the data processing record for the organization further comprises generating a first value for a first field of the data processing record based upon the second data from the second data source.

17. The method of claim 16, wherein the second data source is a webpage that pertains to a computer-executable application used by the organization, wherein the webpage comprises text, wherein the second data is the text, wherein the text indicates that the computer-executable application processes the data that relates to the person, and further wherein obtaining the second data from the second data source comprises retrieving the webpage and extracting the text from the webpage.

18. The method of claim 14, wherein the data source is source code of a computer-executable application of the organization, and further wherein the data is generated based upon a static analysis of the source code.

19. The method of claim 14, wherein the entry identifies a type of data processing performed with respect to the data that relates to the person, and further wherein constructing the data processing record comprises identifying the type of data processing from amongst several predefined types of data processing based upon the data.

20. A computer-readable storage medium comprising instructions that, when executed by a processor, cause the processor to perform acts comprising:
obtaining first data from a first data source, wherein the first data source is in network communication with the computing system;
obtaining second data from a second data source, wherein the second data source is in network communication with the computing system, and further wherein the first data source and the second data source are different from one another;
receiving, from a computing device of an enterprise, a request to construct a data processing record on behalf of the enterprise;
upon receiving the request, constructing the data processing record for the enterprise based upon the first data and the second data, wherein the data processing record comprises an entry that indicates that that a computer-executable application corresponding to the enterprise processes data that relates to a person, wherein the entry is generated by the computing system based upon the first data and the second data, and further wherein the constructed data processing record indicates whether or not the enterprise complies with at least one of a policy, law, or regulation with respect to processing the data that relates to the person; and
transmitting the data processing record to the computing device of the enterprise for presentment to a user of the computing device of the enterprise.

* * * * *